June 28, 1955 A. F. ZERO 2,711,653
DEVICE FOR CONVERTING ROTARY MOVEMENT TO HARMONIC MOVEMENT
Filed June 30, 1952 2 Sheets-Sheet 1

INVENTOR.
ANTHONY F. ZERO
BY George Sipkin
Lee J. Huntzberger
Attorneys

June 28, 1955          A. F. ZERO          2,711,653
DEVICE FOR CONVERTING ROTARY MOVEMENT TO HARMONIC MOVEMENT
Filed June 30, 1952          2 Sheets-Sheet 2
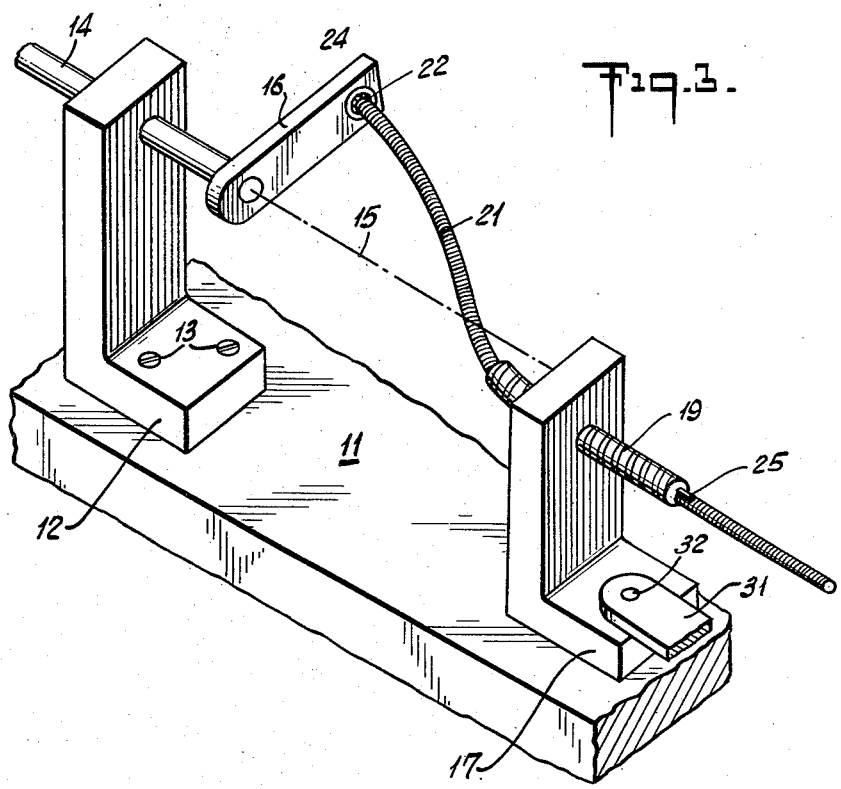
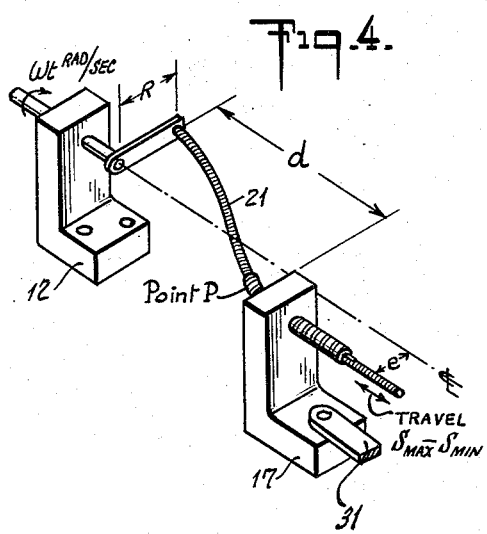
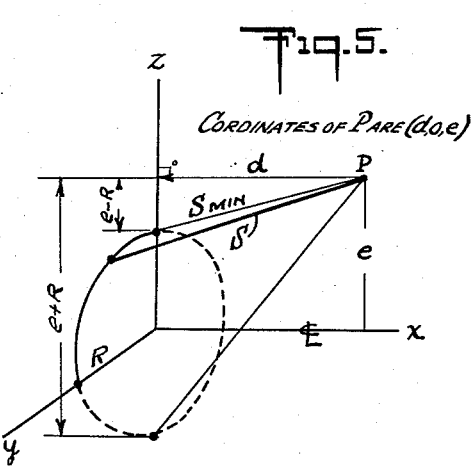
INVENTOR.
ANTHONY F. ZERO
BY George Sipkin
Lee J. Huntzberger
Attorneys

United States Patent Office 2,711,653
Patented June 28, 1955

2,711,653

DEVICE FOR CONVERTING ROTARY MOVEMENT TO HARMONIC MOVEMENT

Anthony F. Zero, New York, N. Y.

Application June 30, 1952, Serial No. 296,511

6 Claims. (Cl. 74—25)

(Granted under Title 35, U. S. Code (1952), sec. 266)

The invention described herein may be manufactured and used by or for the Government of the United States of America for governmental purposes without the payment of any royalties thereon or therefor.

The present invention concerns a mechanical movement and in particular concerns a movement for converting rotary motion to another form of motion. In its preferred embodiment the invention comprises a movement for converting rotary motion into harmonic motion that may, if desired, include rotary motion.

In connection with training devices and in connection with tools and equipment such as grinders and honing devices, it is necessary to provide a simple and inexpensive means for furnishing harmonic motion that may, if desired, include rotary motion. Conventional mechanisms for furnishing such motion include a connecting rod, crank and crosshead system to produce the harmonic motion and suitable gearing or belting to impart the rotary motion through a ball joint or by means of an accurate cam design. Such devices have the disadvantage of being complicated and requiring numerous components which render the device expensive to manufacture, complicated to operate and subject to easy disrepair.

The present invention overcomes these difficulties by providing a device that is simple and has a small number of components, that is inexpensive to manufacture, that is simple in operation and that is easily maintained in repair.

An object of the invention is to provide a device for converting rotary motion to another form of motion.

Another object is to provide a device for converting rotary motion into harmonic motion that may, if desired, include rotary motion.

Another object is to provide a device that is simple in construction and has a minimum number of components for converting rotary motion into harmonic motion that may, if desired, include rotary motion.

Other objects and many of the attendant advantages of this invention will be readily appreciated as the same becomes better understood by reference to the following detailed description when considered in connection with the accompanying drawings wherein:

Fig. 3 is a view similar to Fig. 1 of a modification showing a means for moving the bearing that forms one component of the device to adjust the harmonic motion.

Fig. 4 is an isometric view of the embodiment shown in Fig. 1 with legends thereto added indicating mathematical relationships, and Fig. 5 is a diagrammatic view illustrating mathematical relationships.

Figure 1:
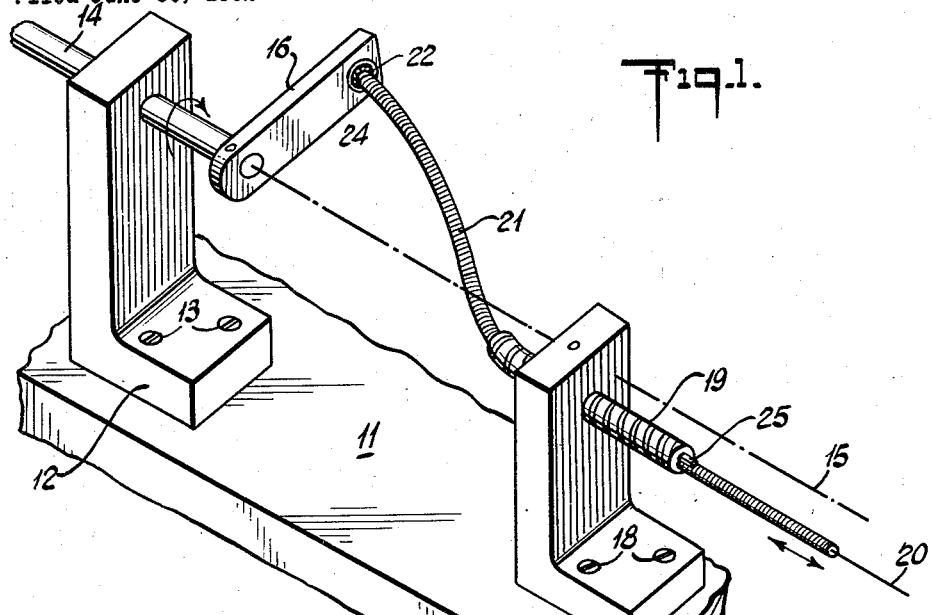
Fig. 1 is an isometric view of a preferred embodiment of the invention for converting rotary motion into harmonic motion.

In Fig. 1 there is shown a base 11 upon which is fixedly mounted a bracket 12 by means of screws 13. Mounted for rotation in bracket 12 is a shaft 14 having an axis 15. Fixedly mounted on the end of shaft 14 for rotation therewith is a crank 16.

On base 11 in spaced relation from bracket 12 is a bearing bracket 17 that is fixedly mounted to base 11 by screws 18. Fixedly mounted in bracket 17 is a flexible tubular casing 19 having an axis 20.

There is provided a flexible shaft 21 that is connected at one end 22 thereof with crank 16. In the form of invention shown in Fig. 1 the end 22 of flexible shaft 21 is rotatably connected to crank 16 by ball-bearing assembly 24 so that there can be relative rotational movement between flexible shaft 21 and crank 16. A portion of flexible shaft 21 remote from end 22 extends slidably through flexible tubular casing 19. By this construction end 22 of flexible shaft 21 is constrained for movement in a circular path with crank 16 but end 22 of shaft 21 because of bearing assembly 24 does not rotate about its own axis. Key 25 prevents rotation of shaft 21 about its own axis. Rotation of crank 16 then produces harmonic motion of flexible shaft 21.

Flexible shaft 21 is of the conventional type used in driving dentists drills; it has the characteristics of transmitting rotary motion and of being flexible. The flexible shaft 21 can be made conventionally of spring wire or other suitable material. In one conventional form flexible shaft 21 includes a central flexible shaft enclosed in a flexible tubular sheath with the sheath formed of spiral wound wire that is flat or circular.

Figure 2:
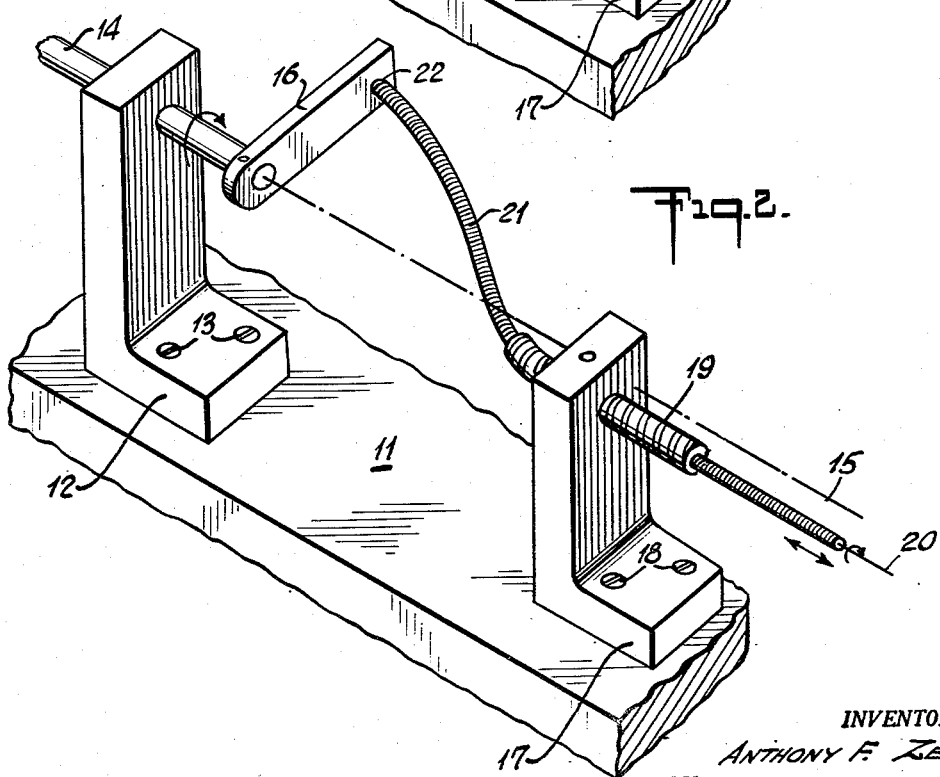
Fig. 2 is an isometric view of a modification for converting rotary motion into harmonic motion plus rotary motion.

In Fig. 2 there is shown modification that is in many parts similar to the embodiment shown in Fig. 1 and parts that are identical in Fig. 1 and Fig. 2 are given identical reference characters. There is shown in Fig. 2 a fixed connection between the end 22 of flexible shaft 21 and crank 16 so that there can be no relative rotational movement between flexible shaft 21 and crank 16. By this construction end 22 of flexible shaft 21 is constrained for movement in a circular path with crank 16 and shaft 21 during such movement rotates about its own axis. Rotation of crank 16 thus produces harmonic motion plus rotary motion of flexible shaft 21.

In Fig. 3 there is shown a modification that is in many parts similar to the embodiment shown in Fig. 1 and parts that are identical in Fig. 1 and Fig. 3 are given identical reference characters. There is provided means for moving bearing 17 in order to adjust harmonic motion. In Fig. 3 bearing 17 is not fixedly mounted upon base 11 but is mounted for movement relative thereto in a direction parallel to axes 15 and 20 and in a direction transverse thereto. In Fig. 3 there is shown an actuating arm 31 that is associated with bearing 17 by connector 32. Arm 31 is adapted for connection to a suitable power source (not shown) for moving arm 31 to move bracket 17 either parallel to axes 15 and 20 or transverse thereto. Movement of bracket 17 in a direction parallel to axes 15 and 20 varies the distance between crank 16 and bearing 17 measured parallel to axes 15 and 20. Movement of bearing 17 in a direction perpendicular thereto and parallel to base 11 varies the offset distance between axes 15 and 20. Variation of these two distances adjusts the harmonic motion of flexible shaft 21. The mathematical justification of such adjustment of harmonic motion is found in connection with Fig. 4 and Fig. 5 as follows:

In Fig. 4 there is shown the view of Fig. 1 in which there are added mathematical legends. In Fig. 5 there is a diagrammatic showing of the mathematical relationships between the parts of the device. In Figs. 4 and 5 the mathematical legends are defined as follows:

$w$ = angular velocity of crank in radians per sec.
$t$ = time in seconds
$e$ = eccentricity between point P (point of bearing) and centerline or rotation of crank.
$R$ = radius of crank from center of rotation to point where shaft is attached.
$d$ = distance measured along the centerline of rotation of crank out to the point P.
$s$ = length of line from point P to any point on the circle of rotation of crank with radius R rotating at $w$ radians per sec.

The mathematical derivation of the values of S, $S_{min}$ and $S_{max}$ are as follows:

$$S_{min} = \text{minimum length of } S$$
$$S_{max} = \text{maximum length of } S$$
$$S = \sqrt{d^2 + (R \sin wt)^2 + (R \cos wt - e)^2}$$
$$S_{min} = \sqrt{(e-R)^2 + d^2}$$
$$S_{max} = \sqrt{(e+R)^2 + d^2}$$
$$S_{max} - S_{min} = \text{total travel of harmonic motion}$$

From the above it is seen that the total travel of harmonic motion, which is equal to $S_{max}$ minus $S_{min}$, can be adjusted by the expedient of varying the value of $d$ and $e$. This is accomplished by movement of bracket 17 under the influence of actuating rod 31.

In operation if it is desired to convert rotary motion to harmonic motion alone, there is used the embodiment of Fig. 1. Shaft 14 is connected to a suitable power source (not shown) for rotating shaft 14 and the free end of flexible shaft 21 is connected to the training device, tool or equipment to which it is desired to impart harmonic motion. Rotation of shaft 14 causes the free end 22 of flexible shaft 21 to move in a circular path. However, flexible shaft 21 does not rotate about its own axis because of bearing assembly 24 and key 25 positively prevents flexible shaft 21 from rotating on its own axis. Rotation of shaft 14 and crank 16 thus produces harmonic motion of flexible shaft 21 without any rotary movement of shaft 21.

Operation of the modification of Fig. 2 is similar except that rotation of shaft 14 and crank 16, because of the fixed connection of flexible shaft 21 to crank 16, causes rotation of flexible shaft 21 on its own axis and there is thus produced harmonic motion plus rotary motion of flexible shaft 21.

Operation to adjust the harmonic motion is effected by the modification of Fig. 3. Movement of actuating arm 31 to move bracket 17 either parallel to axes 15 and 20 or transverse thereto varies the dimensions $d$ or $e$, respectively, of Fig. 4 and Fig. 5. This results in varying the travel of flexible shaft 21, which equals $S_{max} - S_{min}$, to adjust the harmonic motion.

Obviously many modifications and variations of the present invention are possible in the light of the above teachings. It is therefore to be understood that within the scope of the appended claims the invention may be practiced otherwise than as specifically described.

I claim:

1. A device adapted for use in connection with tools and equipment such as grinders and honers and also adapted for use in connection with training means, said device comprising: a crank rotatable about an axis; a bearing having an axis, said bearing being so located that its axis is parallel to and offset from the crank axis; and a flexible shaft, said flexible shaft being located within said bearing for sliding movement therein, each of the ends of said flexible shaft extending axially beyond said bearing, one of the ends of said flexible shaft being attached to said crank whereby the opposite end of said flexible shaft is adapted to be selectively positioned in an infinite number of positions relative to said bearing and in any one of which positions it is adapted to move cyclically under the mechanical influence of said crank.

2. A device as recited in claim 1, said device further including means for locking said flexible shaft against rotation about its own axis.

3. A device as recited in claim 1, said device further including means for moving said bearing.

4. A device as recited in claim 1, said device further including means for locking said shaft against rotation about its own axis; and additional means for moving said bearing.

5. A device as recited in claim 1 and further characterized by the fact that the one end of said flexible shaft is rigidly attached to said crank.

6. A device as recited in claim 5 and further including means for moving said bearing.

References Cited in the file of this patent
UNITED STATES PATENTS

| | | |
|---|---|---|
| 1,475,990 | Erickson | Dec. 4, 1923 |
| 2,181,234 | Hawes | Nov. 28, 1939 |
| 2,360,876 | Hvid | Oct. 24, 1944 |